J. A. WERTZ.
SIGNALING DEVICE.
APPLICATION FILED JAN. 19, 1916.
1,195,757. Patented Aug. 22, 1916.
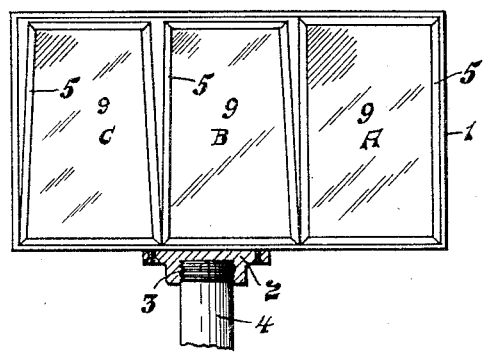
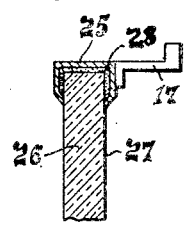
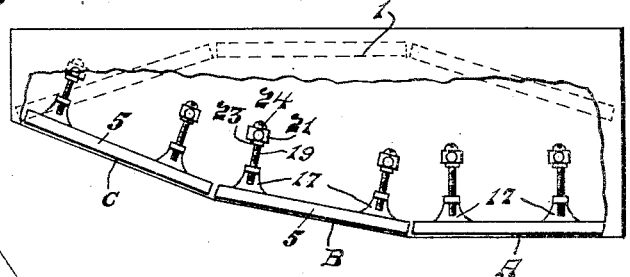
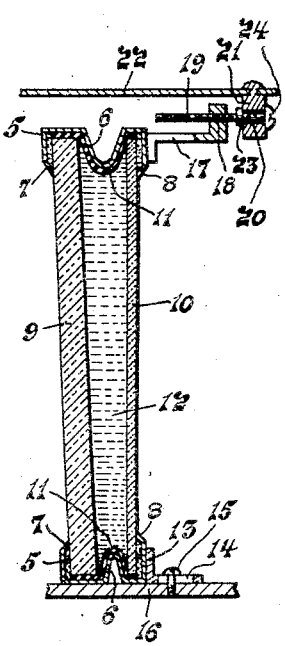
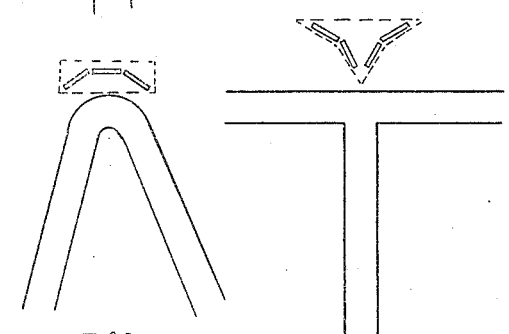
Witness
Robert O. Karcher
Inventor
John A. Wertz
By F. W. Bond
Attorney

UNITED STATES PATENT OFFICE.

JOHN A. WERTZ, OF CANTON, OHIO.

SIGNALING DEVICE.

1,195,757.  Specification of Letters Patent.  Patented Aug. 22, 1916.

Application filed January 19, 1916. Serial No. 72,955.

*To all whom it may concern:*

Be it known that I, JOHN A. WERTZ, a citizen of the United States, residing at Canton, in the county of Stark and State of Ohio, have invented a new and useful Signaling Device, of which the following is a specification.

The present invention relates to signaling devices and has more especial reference to a device adapted to be located at dangerous points along a roadway or at intersections or cross roads or railway crossings and is adapted to catch the rays of light from an automobile headlight or from the headlight of a steam train or electric train or car and reflect said rays of light back to the operator of the vehicle or to the operator of an approaching vehicle coming from another direction, means being provided within the device for coloring the reflected rays.

The object of the present invention is to provide a signal device of the character referred to which will reflect the rays of light from the headlight of an approaching vehicle back to the operator or to the operator of another vehicle approaching from another direction, means being provided for changing the color of the reflected rays.

A further object is to provide a device of the character referred to which comprises a transparent member and reflector or series of such, a coloring matter placed in front of each reflector and means for adjusting the reflector at different angles to each other.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

In the accompanying drawings: Figure 1 is a front elevation of the signaling device showing one arrangement of the reflectors. Fig. 2 is a top plan view of the same, parts being broken away for the purpose of illustration. Fig. 3 is a vertical sectional view through one of the reflectors and the adjacent parts. Fig. 4 is a fragmentary section of the upper portion of a modified form of reflector and transparent member. Fig. 5 is a diagrammatic view showing the arrangement of reflectors and transparent members to be located at a dangerous spot on a slight turn in a road. Fig. 6 is a similar view of a hair pin or horseshoe bend in a road. Fig. 7 is a similar view showing the position of the device with reference to an intersecting road. Fig. 8 shows the location of the device at a cross road.

Similar numerals of reference indicate corresponding parts throughout all the figures of the drawings.

The device comprises a metal box 1 preferably formed of heavy sheet material, open upon one side and provided upon its lower face with a suitable casting 2 provided with a socket 3 preferably screw threaded for the purpose of receiving the upper extremity of a post 4, said post being anchored in the ground at a suitable location beside the road. A series of reflectors and transparent members are adjustably secured within the box at suitable angles to each other and focused to the road to catch the rays of light of a headlight of an approaching vehicle and reflect said rays as will be hereinafter described, a transparent coloring matter being provided upon the back of the transparent member for the purpose of changing the color of the reflected rays of light.

Each of the reflectors is made up as best shown in Figs. 1, 2 and 3 of the drawings and comprises a sheet metal sash or frame 5 formed as best shown in Fig. 3, said frame being tapered from top to bottom and provided around its edge with an inwardly disposed rib 6, the edges of the material being turned inwardly at 7 and 8 forming with the rib a pair of rectangular pockets adapted to receive the transparent member 9 and the reflector 10 respectively. A sheet of rubber or similar material 11 is placed around the inner face of the sash and coated with a heavy solution of silicate of soda or substitutes, for the purpose of hermetically sealing the tapered pocket 12, which is formed between the transparent member and reflector. The pocket 12 is filled with a liquid preferably a chemical sensitive to light or where a milder reflection is desired any suitable colored transparent fluid may be used or in case of a very mild or short focus signal being desired the transparent member may be of colored glass or colored back as hereinbefore described.

The sashes are provided at their lower extremities with brackets 13, said brackets being preferably of angular form and provided with elongated slots 14 through which screws 15 or their equivalents may be passed, said screws engaging the bottom wall 16 of the box 1. Brackets 17 are provided at the upper extremities of the frames, each of said brackets being provided with an internally screw threaded socket 18 adapted to receive the screw threaded stem 19, said stem being provided with a plain portion, which is rotatably located through an aperture 20 in the block 21, each of said blocks being connected to the top wall 22 of the box 1 as shown. A shoulder 23 is provided upon the screw threaded stem 19 at one side of the block 21 and a slotted head 24 is provided upon said stem at the other side of said block. As the brackets 13 and 17 are both of spring material the rotation of the screw threaded stems 19 will permit of an angular adjustment of the sashes.

In Fig. 4 is shown a modified form of construction of reflector. In this modified form the sash 25 is of the form shown in cross section in Fig. 4 and the reflector proper comprises the colored plate glass 26 provided upon its back with a suitable coating of any common transparent colored material adapted to change the rays of light before reaching the reflector. A suitable cement such as the silicate of soda above referred to is located at 28 in order to firmly fasten the glass and reflector within the sash. The object of the chemical pocket 12 being tapered is to cause the strength of the reflected rays of colored light to be at their greatest while the approaching light is at its farthest focal distance away. This result is obtained by locating the wider portion of the reflector above the horizontal line through the headlights of the average vehicle the absorptive capacity of the reflector being graduated, decreasing downwardly. The purpose of this construction is to provide a reflector, the upper or wider portion of which will first catch the light rays from an approaching vehicle, the reflected rays of colored light being the strongest at the point where the approaching vehicle first receives the reflected rays from the reflector, the point of reflection upon the reflector gradually moving downwardly upon said reflector as the vehicle approaches.

Some of the practical applications of the device are shown in Figs. 5 to 8 inclusive.

In Fig. 5 is shown a device with the reflectors arranged as shown in Figs. 1 and 2 and so placed at a slight turn in the road that the headlights of a vehicle approaching from the direction indicated by the arrow would throw a ray of light upon the signal, said signal returning a colored ray of light back to the occupants of the approaching vehicle warning them that they are nearing a dangerous point in the roadway. The light rays from the approaching vehicle will first be caught by the upper right hand portion of the reflector designated by the letter A and as the vehicle approaches near the rays will be seen coming from the lower left hand corner, after which they will be returned from the upper right hand corner of the reflector B and their travel repeated and likewise they will be reflected by the reflector C.

Fig. 6 shows another adjustment of the reflectors in a device such as illustrated in Figs. 1, 2 and 5. In this figure the device is arranged to be placed at a "hair pin" or "horseshoe" turn in the road and the reflectors are so adjusted that the light rays from a vehicle approaching from either direction will be transformed into colored rays and reflected to a vehicle approaching from the opposite direction.

In Fig. 7 is illustrated the application of what might be termed a three-way signaling device, the reflectors being so arranged at a point where one road intersects another that vehicles approaching the intersection upon either road will reflect a red light back to vehicles approaching from the other road.

Fig. 8 shows a duplication of the device shown in Fig. 7 adapted to be located at a cross road in order to reflect a colored light in either direction along either road.

I claim:

1. A signaling device comprising a sash, a reflector carried within said sash, a transparent member carried in said sash and spaced from said reflector forming a pocket between said reflector and said transparent member and a colored or sensitive liquid located within said pocket.

2. A signaling device comprising a metal sash provided with an inwardly disposed rib, intermediate the edges and parallel therewith, inwardly disposed flanges being provided around the edges of said sash, a sheet of rubber or similar material being located around the inner surface of said sash, said rubber being coated with a cement impervious to chemicals, a reflector located within said sash between said rib and one of said flanges, a lens located between said rib and the other of said flanges and a transparent colored material or sensitive chemical located between said reflector and said lens.

3. A signaling device comprising a metal sash provided with an inwardly disposed rib, intermediate the edges and parallel therewith, inwardly disposed flanges being provided around the edges of said sash, a sheet of rubber or similar material being located around the inner surface of said sash, said rubber being coated with a cement impervious to chemicals, a reflector located within said sash between said rib and one of said flanges, a lens located between said rib and the other of said flanges and a colored liquid or sensitive chemical located between said reflector and said lens.

4. A signaling device comprising a sash, a reflector carried within said sash, a transparent member carried within said sash and spaced from said reflector and a transparent colored material or sensitive chemical located between said reflector and said lens.

5. A signaling device comprising a plurality of sashes, a reflector carried in each sash, a transparent member carried in each sash and spaced from said reflector forming a pocket between said reflector and said transparent member, a colored liquid located within said pocket and means for providing anticlinal, radial and horizontal adjustment of said sashes.

6. A signaling device comprising a plurality of sashes, each of said sashes comprising a reflector and a transparent colored material located in front of said reflector, said sashes located at angles to each other and means for anticlinal, radial and horizontal adjustment of said sashes.

7. A signaling device comprising a sash, a reflector carried within said sash, a transparent member carried in said sash and spaced from said reflector, said reflector and transparent member converging toward their lower ends forming a downwardly tapered pocket between the reflector and transparent member and a colored liquid located within said pocket.

In testimony that I claim the above, I have hereunto subscribed my name.

JOHN A. WERTZ.